(12) United States Patent
Fukudome et al.

(10) Patent No.: US 11,802,552 B2
(45) Date of Patent: Oct. 31, 2023

(54) CAPACITY CONTROL VALVE

(71) Applicant: Eagle Industry Co., Ltd., Tokyo (JP)

(72) Inventors: Kohei Fukudome, Tokyo (JP); Keigo Shirafuji, Tokyo (JP); Masahiro Hayama, Tokyo (JP); Toshinori Kanzaki, Tokyo (JP); Keichi Urushiyama, Tokyo (JP)

(73) Assignee: EAGLE INDUSTRY CO., LTD.

( * ) Notice: Subject to any disclaimer, the term of this patent is extended or adjusted under 35 U.S.C. 154(b) by 94 days.

(21) Appl. No.: 17/622,667

(22) PCT Filed: Jul. 8, 2020

(86) PCT No.: PCT/JP2020/026723
§ 371 (c)(1),
(2) Date: Dec. 23, 2021

(87) PCT Pub. No.: WO2021/010259
PCT Pub. Date: Jan. 21, 2021

(65) Prior Publication Data
US 2022/0243710 A1 Aug. 4, 2022

(30) Foreign Application Priority Data
Jul. 12, 2019 (JP) .................................. 2019-130469

(51) Int. Cl.
 *F04B 27/18* (2006.01)
 *F16K 31/06* (2006.01)
 *F16K 11/24* (2006.01)

(52) U.S. Cl.
 CPC .... *F04B 27/1804* (2013.01); *F04B 2027/189* (2013.01); *F04B 2027/1859* (2013.01); *F16K 11/24* (2013.01); *F16K 31/06* (2013.01)

(58) Field of Classification Search
 CPC ...... F04B 27/18; F04B 27/1804; F04B 49/22; F04B 2027/1831; F04B 2027/1859; F04B 2027/189; F16K 31/06; F16K 11/24
 See application file for complete search history.

(56) References Cited

U.S. PATENT DOCUMENTS

| 2,267,515 A | 12/1941 | Wilcox |
| 3,360,304 A | 12/1967 | Adams ..................... B61K 7/12 |

(Continued)

FOREIGN PATENT DOCUMENTS

| EP | 0771948 | 5/1997 | .............. F04B 27/18 |
| EP | 2784320 | 10/2014 | .............. F04B 27/18 |

(Continued)

OTHER PUBLICATIONS

European Search Report issued in related Application Serial No. 20837707.7, dated May 4, 2023, 5 pages.

(Continued)

*Primary Examiner* — Devon C Kramer
*Assistant Examiner* — Joseph S. Herrmann
(74) *Attorney, Agent, or Firm* — HAYES SOLOWAY P.C.

(57) ABSTRACT

A capacity control valve includes a valve housing to which a suction fluid having a suction pressure and a control fluid having a control pressure are supplied; a solenoid; a CS valve body that partitions an inside of the valve housing into a first space, and a second space and moves according to the suction pressure of the suction fluid and the control pressure of the control fluid, and a CS valve seat with which the CS valve body is configured to come into contact; a biasing member biasing the CS valve body in a valve opening direction of the valve; and a pilot valve formed of a pilot valve body to be driven by the solenoid and a pilot valve seat with which the pilot valve body is configured to come into contact.

20 Claims, 8 Drawing Sheets

(56) References Cited

U.S. PATENT DOCUMENTS

| | | | | |
|---|---|---|---|---|
| 4,579,145 | A | 4/1986 | Leiber | F16H 61/0251 |
| 4,615,358 | A | 10/1986 | Hammond | F15B 13/0402 |
| 4,895,192 | A | 1/1990 | Mortenson | F15B 11/04 |
| 4,917,150 | A | 4/1990 | Koch | F16K 31/0606 |
| 4,979,542 | A | 12/1990 | Mesenich | F02M 47/027 |
| 4,998,559 | A | 3/1991 | McAuliffe | F16H 61/0251 |
| 5,048,790 | A | 9/1991 | Wells | F16K 31/383 |
| 5,060,695 | A | 10/1991 | McCabe | G05D 16/2024 |
| 5,063,829 | A | 11/1991 | Takao et al. | F01B 3/00 |
| 5,217,047 | A | 6/1993 | McCabe | F16H 61/0251 |
| 5,286,172 | A | 2/1994 | Taguchi | F04B 1/26 |
| 5,778,932 | A | 7/1998 | Alexander | G05D 16/2024 |
| 6,161,585 | A | 12/2000 | Kolchinsky | G05D 16/2024 |
| 6,354,811 | B1 | 3/2002 | Ota et al. | 417/222.2 |
| 6,358,017 | B1 | 3/2002 | Ota et al. | 417/222.2 |
| 6,361,283 | B1 | 3/2002 | Ota et al. | 417/222.2 |
| 6,434,956 | B1 | 8/2002 | Ota | 62/133 |
| 7,014,427 | B1 | 3/2006 | Hirota | 417/218 |
| 8,021,124 | B2 | 9/2011 | Umemura et al. | 417/222.2 |
| 8,225,818 | B1 | 7/2012 | Stephens | F15B 13/0442 |
| 9,022,346 | B2 | 5/2015 | Najmolhoda | F16K 31/0613 |
| 9,027,598 | B2 | 5/2015 | Schneider | F16K 31/0613 |
| 9,453,518 | B2 | 9/2016 | Schulz | F15B 13/043 |
| 2001/0016168 | A1 | 8/2001 | Mameda et al. | F04B 1/26 |
| 2002/0134444 | A1 | 9/2002 | Isobe | F16K 27/041 |
| 2004/0060604 | A1 | 4/2004 | Uemura et al. | 137/595 |
| 2004/0120829 | A1 | 6/2004 | Pitla et al. | F04B 1/12 |
| 2005/0076959 | A1 | 4/2005 | Yamamoto | F16K 31/0624 |
| 2005/0265853 | A1 | 12/2005 | Hirota | F04B 1/12 |
| 2006/0165534 | A1 | 7/2006 | Umemura et al. | F04B 1/26 |
| 2006/0218953 | A1 | 10/2006 | Hirota | 62/228.5 |
| 2008/0138213 | A1* | 6/2008 | Umemura | F04B 27/1804 137/625.65 |
| 2009/0183786 | A1 | 7/2009 | Iwa et al. | 137/487.5 |
| 2009/0256091 | A1 | 10/2009 | Nordstrom | F16K 31/0613 |
| 2011/0089352 | A1* | 4/2011 | Morgan | F16K 11/0716 251/366 |
| 2012/0198992 | A1 | 8/2012 | Futakuchi et al. | 91/505 |
| 2014/0130916 | A1 | 5/2014 | Saeki et al. | F16K 31/0613 |
| 2014/0369862 | A1* | 12/2014 | Ota | F04B 27/1804 417/222.2 |
| 2015/0027573 | A1 | 1/2015 | Ochiai | F15B 13/0402 |
| 2015/0044065 | A1 | 2/2015 | Ota | F04B 27/18 |
| 2015/0044067 | A1 | 2/2015 | Ota | F04B 27/1804 |
| 2015/0211506 | A1* | 7/2015 | Shirafuji | F04B 27/1804 417/269 |
| 2015/0345655 | A1 | 12/2015 | Higashidozono et al. | F16K 31/0624 |
| 2017/0356430 | A1 | 12/2017 | Irie et al. | F04B 27/1804 |
| 2018/0156345 | A1 | 6/2018 | Kanda | F15B 13/0431 |
| 2021/0180715 | A1 | 6/2021 | Hayama et al. | F16K 31/122 |

FOREIGN PATENT DOCUMENTS

| | | | |
|---|---|---|---|
| EP | 3431760 | 1/2019 | F04B 27/18 |
| JP | 5306679 | 11/1993 | F04B 27/08 |
| JP | 6-200875 | 7/1994 | F04B 27/08 |
| JP | 3088536 | 7/2000 | F04B 27/08 |
| JP | 2000-345961 | 12/2000 | F04B 27/14 |
| JP | 2001-73939 | 3/2001 | F04B 27/14 |
| JP | 2001-107854 | 4/2001 | F04B 27/14 |
| JP | 2001-132632 | 5/2001 | F04B 27/14 |
| JP | 3581598 | 7/2004 | F04B 29/10 |
| JP | 2006-17035 | 1/2006 | F04B 27/14 |
| JP | 2006-52648 | 2/2006 | F04B 27/14 |
| JP | 2006-170140 | 6/2006 | F04B 27/14 |
| JP | 2006-307828 | 11/2006 | F04B 27/14 |
| JP | 4242624 | 1/2009 | F04B 49/00 |
| JP | 2011-32916 | 2/2011 | F04B 27/14 |
| JP | 4700048 | 3/2011 | F04B 49/00 |
| JP | 2011-94554 | 5/2011 | F04B 27/08 |
| JP | 5167121 | 12/2012 | F04B 27/14 |
| JP | 5557901 | 6/2014 | F04B 27/14 |
| JP | 2014-190247 | 10/2014 | F04B 27/14 |
| JP | 2015-1168 | 1/2015 | F04B 27/14 |
| JP | 2015-34509 | 2/2015 | F04B 27/14 |
| JP | 2015-34510 | 2/2015 | F04B 27/14 |
| JP | 2017-129042 | 7/2017 | F04B 27/18 |
| JP | 6206274 | 10/2017 | F04B 27/18 |
| JP | 2017-223348 | 12/2017 | F16K 11/10 |
| JP | 2018-021646 | 2/2018 | F04B 27/18 |
| JP | 2018-40385 | 3/2018 | F16K 31/06 |
| JP | 2018-145877 | 9/2018 | F04B 27/12 |
| WO | WO 2007119380 | 10/2007 | F04B 27/14 |
| WO | WO2013109005 | 7/2013 | F04B 27/14 |
| WO | WO 2014091975 | 6/2014 | F04B 27/14 |
| WO | WO 2014119594 | 8/2014 | F04B 27/14 |
| WO | WO 2017057160 | 4/2017 | F04B 27/18 |
| WO | WO 2017159553 | 9/2017 | F04B 27/18 |
| WO | WO2018207461 | 11/2018 | F04B 27/18 |
| WO | WO2019131703 | 7/2019 | F04B 27/18 |
| WO | WO2019167912 | 2/2021 | F04B 27/18 |

OTHER PUBLICATIONS

Chinese Official Action issued in related Chinese Official Action issued in Application No. 202080049328.6 dated Jan. 13, 2023 with English Translation, 7 pages.

Chinese Official Action issued in related Chinese Official Action issued in Application No. 202080074812.4 dated Jan. 18, 2023 with English Translation, 10 pages.

European Search Report issued in related Application Serial No. 19891826.0, dated May 25, 2022, 7 pages.

International Preliminary Report on Patentability issued in PCT/JP2020/039833, dated May 3, 2022, with English translation, 5 pages.

International Search Report and Written Opinion issued in PCT/JP2020/039833, dated Dec. 8, 2020, with English translation, 13 pages.

Notice of Allowance issued in related U.S. Appl. No. 17/299,288, dated Apr. 19, 2022, 12 pages.

U.S. Appl. No. 17/618,169, filed Dec. 10, 2021, Fukudome et al.
U.S. Appl. No. 17/771,412, filed Apr. 22, 2022, Hayama et al.
U.S. Appl. No. 17/299,288, filed Jun. 2, 7021, Fukudome et al.
U.S. Appl. No. 17/056,988, filed Nov. 19, 2020, Kurihara et al.
U.S. Appl. No. 17/622,667, filed Dec. 23, 2021, Fukudome et al.

International Search Report and Written Opinion issued in PCT/JP2020/026722, dated Sep. 29, 2020, with English translation, 11 pages.

International Preliminary Report on Patentability issued in PCT/JP2020/026722, dated Jan. 20, 2022, 5 pages.

International Search Report and Written Opinion issued in PCT/JP2020/026723, dated Sep. 8, 2020, with English translation, 11 pages.

International Preliminary Report on Patentability issued in PCT/JP2019/026723, dated Jan. 18, 2022, 4 pages.

International Preliminary Report on Patentability issued in PCT/JP2019/020196, dated Nov. 24, 2020, with English translation, 6 pages.

International Search Report and Written Opinion issued in PCT/JP2019/020196, dated Aug. 27, 2019, with English translation, 11 pages.

International Preliminary Report on Patentability issued in PCT/JP2019/047193, dated Dec. 3, 2021, with English translation, 6 pages.

International Search Report and Written Opinion issued in PCT/JP2019/047193, dated Aug. 27, 2019, with English translation, 11 pages.

Chinese Official Action issued in related Chinese Official Action dated Dec. 1, 2021 with English Translation, 7 pages.

Notice of Allowance issued in related application U.S. Appl. No. 17/056,988, dated Oct. 27, 2021 9 pages.

* cited by examiner

CAPACITY CONTROL VALVE

TECHNICAL FIELD

The present invention relates to a capacity control valve that variably controls capacity of a working fluid, for example, a capacity control valve that controls a discharge amount of a variable displacement compressor used for an air conditioning system of an automobile according to pressure.

BACKGROUND ART

A variable displacement compressor used for an air conditioning system of an automobile, etc. includes a rotating shaft to be driven and rotated by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of a fluid. This tilt angle of the swash plate can be continuously changed by appropriately controlling pressure in a control chamber while utilizing a suction pressure Ps of a suction chamber that suctions the fluid, a discharge pressure Pd of a discharge chamber that discharges the fluid pressurized by the pistons, and a control pressure Pc of the control chamber that houses the swash plate, by means of a capacity control valve to be driven to open and close by electromagnetic force.

At the time of continuously driving the variable displacement compressor, the capacity control valve performs normal control in which energization is controlled by a control computer, a valve body is moved in an axial direction by electromagnetic force generated in a solenoid, and a CS valve provided between a control port through which a control fluid of the control pressure Pc passes and a suction port through which a suction fluid of the suction pressure Ps passes is opened and closed to adjust the control pressure Pc of the control chamber of the variable displacement compressor.

For example, the capacity control valve shown in Patent Citations 1 and 2 mainly includes a valve housing including a Pc port through which the control fluid passes and a Ps port through which the suction fluid passes, and the CS valve that can switch the state of communication between the Pc port and the Ps port, and opens and closes the CS valve to adjust the control pressure Pc. The CS valve includes a CS valve body that is driven in the axial direction by the solenoid, and a CS valve seat which is provided between the Pc port and the Ps port and with which the CS valve body can come into contact, and performs control to bring the CS valve into a closed state so that the control pressure Pc is increased, or bring the CS valve into an open state so that the control pressure Pc is lowered.

CITATION LIST

Patent Literature

Patent Citation 1: JP 3088536 B2 (PAGE 3, FIG. 2)
Patent Citation 2: JP 3581598 B2 (PAGE 4, FIG. 8)

SUMMARY OF INVENTION

Technical Problem

By the way, in the air conditioning system, prompt temperature control is required, and there is a potential demand such as wanting to change the flow rate or pressure of a refrigerant to be supplied from the variable displacement compressor in a short time. However, since the capacity control valve of Patent Citations 1 and 2 has a structure in which the CS valve body is directly driven by driving force of the solenoid, in order to increase the flow rate of the refrigerant controlled by the capacity control valve, it is necessary to enlarge the solenoid, the valve body, the valve opening diameter, etc. Thus, energy efficiency deteriorates and it is difficult for the energy efficiency to coexist with reducing the size of the capacity control valve itself.

The present invention has been made in light of such a problem, and an object of the present invention is to provide a capacity control valve having excellent energy efficiency and a large capacity.

Solution to Problem

In order to solve the above problem, a capacity control valve according to the present invention includes: a valve housing to which a suction fluid having a suction pressure and a control fluid having a control pressure are supplied; a solenoid; a CS valve formed of a CS valve body that partitions an inside of the valve housing into a first space and a second space and moves according to the suction pressure of the suction fluid and the control pressure of the control fluid, and a CS valve seat with which the CS valve body is configured to come into contact; a biasing member that biases the CS valve body in a valve opening direction of the CS valve; and a pilot valve formed of a pilot valve body to be driven by the solenoid and a pilot valve seat with which the pilot valve body is configured to come into contact. The control fluid flows into the first space, the suction fluid is flowable into the second space via an orifice, and the control fluid is introduced into the other space by the pilot valve. According to the aforesaid feature of the present invention, when the pilot valve to be driven by the solenoid is opened, the pressure of the other space is raised, and a differential pressure applied to the CS valve body reaches a predetermined value or less, the CS valve can be opened. Therefore, the driving electric power of the solenoid can be reduced, and the valve opening degree of the CS valve can be increased.

It may be preferable that the orifice discharges a fluid of the second space toward a suction chamber in which an external suction fluid is housed. According to this preferable configuration, the fluid can be circulated in a closed system.

It may be preferable that an opening degree of the pilot valve is adjustable. According to this preferable configuration, since the pressure of the fluid of the other space is adjustable, the opening degree of the CS valve is adjustable.

It may be preferable that the CS valve body includes a hollow cylindrical body with an outer flange, and the outer flange slides on an inner peripheral surface of the valve housing. According to this preferable configuration, since the suction fluid can be kept in a sealed state by the CS valve body, the capacity control valve can be compactly configured.

It may be preferable that the CS valve body slides on an outer peripheral surface of a guide member into which the pilot valve body is inserted. According to this preferable configuration, since the suction fluid can be kept in a sealed state by the CS valve body, the capacity control valve can be compactly configured.

It may be preferable that an elastic seal member is disposed between an inner peripheral surface of the CS valve body and the outer peripheral surface of the guide member.

According to this preferable configuration, control fluid sealing performance is excellent.

It may be preferable that a complementary step is formed in an inner peripheral surface of the CS valve body and the outer peripheral surface of the guide member. According to this preferable configuration, control fluid sealing performance is excellent.

It may be preferable that the orifice is be provided in the valve housing. According to this preferable configuration, the capacity control valve can be compactly configured.

It may be preferable that the pilot valve seat is formed in the first space. According to this preferable that, since a part of the pilot valve body is disposed in the first space, and the pressure of the first space is applied to the pilot valve body in a direction in which the pilot valve is closed, there is little risk that the pilot valve is opened when the solenoid is not energized.

It may be preferable that the CS valve seat is formed of an elastic body. According to this preferable configuration, the CS valve can be reliably closed.

It may be preferable that the biasing member is disposed in the second space. According to this preferable configuration, since the biasing member can be disposed using the space into which the suction fluid flows, the capacity control valve can be compactly configured.

It may be preferable that the CS valve body includes, in addition to the hollow cylindrical body with the outer flange, a ring that is externally inserted and fixed to the hollow cylindrical body in an airtight manner and that is provided with an abutting portion configured to abut the CS valve seat. According to this preferable configuration, the CS valve can be easily assembled while securing a large flow rate in the CS valve.

DESCRIPTION OF EMBODIMENTS

Modes for implementing a capacity control valve according to the present invention will be described below based on embodiments.

First Embodiment

Figure 1:
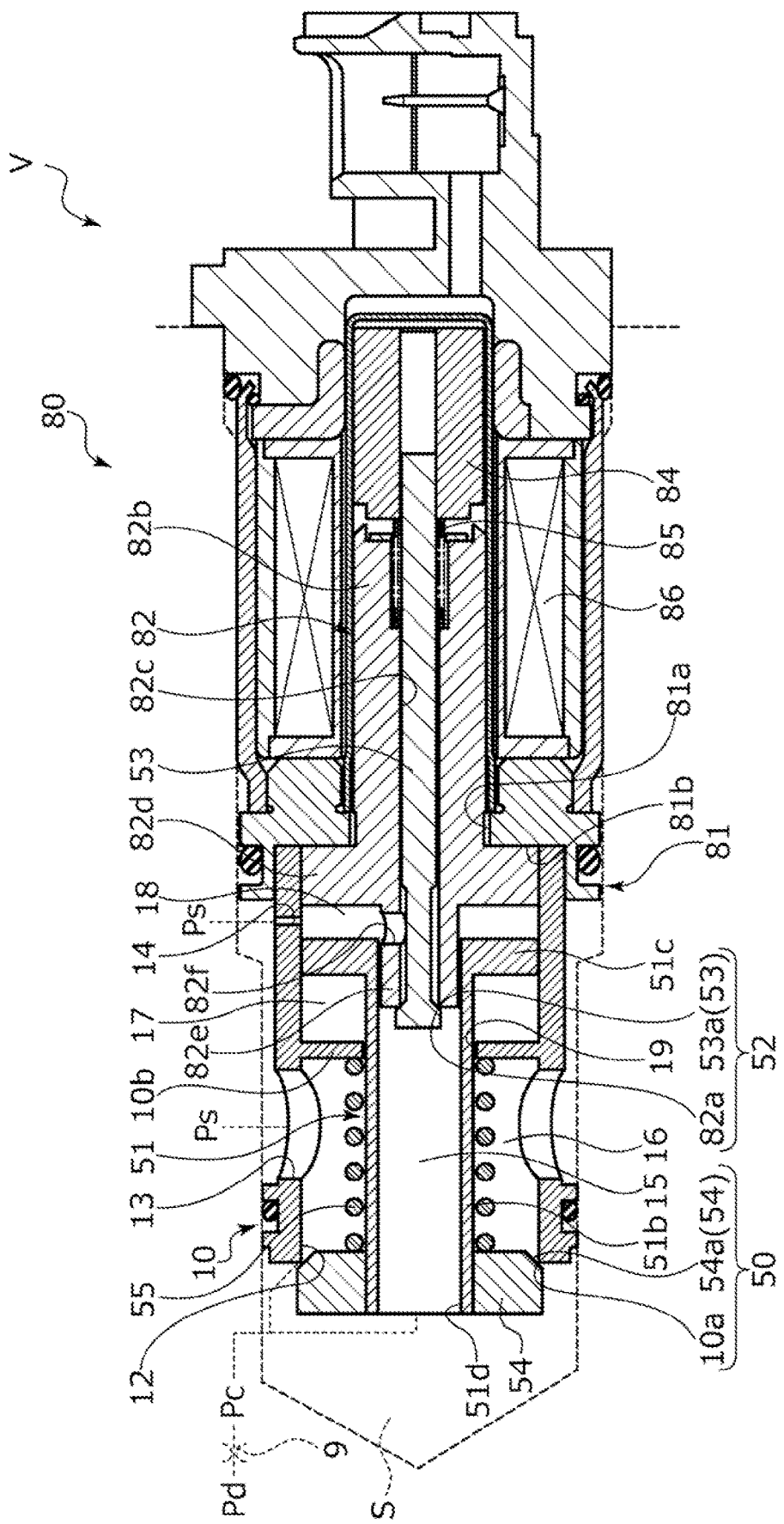
FIG. 1 a sectional view showing a structure of a capacity control valve according to a first embodiment of the present invention.

A capacity control valve according to a first embodiment of the present invention will be described with reference to FIGS. 1 to 3. Hereinafter, a description will be given based on the assumption that the right and left sides when seen from the front side of FIG. 1 are right and left sides of the capacity control valve. In detail, a description will be given based on the assumption that the left side of drawing sheets on which a valve housing 10 is disposed is a left side of the capacity control valve and the right side of the drawing sheets on which a solenoid 80 is disposed is a right side of the capacity control valve.

A capacity control valve V of the present invention is assembled into a variable displacement compressor (not shown) used for an air conditioning system of an automobile, etc., and by variably controlling the pressure of a working fluid (hereinafter, simply referred to as a "fluid") which is a refrigerant, controls the discharge amount of the variable displacement compressor to adjust the air conditioning system to a desired cooling ability.

First, the variable displacement compressor will be described. The variable displacement compressor includes a casing including a discharge chamber, a suction chamber, a control chamber, and a plurality of cylinders. Incidentally, the variable displacement compressor is provided with a communication passage that allows direct communication between the discharge chamber and the control chamber, and the communication passage is provided with a fixed orifice 9 that adjusts and balances the pressures of the discharge chamber and the control chamber (refer to FIGS. 1 to 3).

In addition, the variable displacement compressor includes a rotating shaft to be driven and rotated by an engine (not shown) installed outside the casing; a swash plate coupled to the rotating shaft so as to be tiltable by a hinge mechanism in the control chamber; and a plurality of pistons coupled to the swash plate and reciprocatably fitted in the respective cylinders. The tilt angle of the swash plate is continuously changed by appropriately controlling pressure in the control chamber while utilizing a suction pressure Ps of the suction chamber that suctions the fluid, a discharge pressure Pd of the discharge chamber that discharges the fluid pressurized by the pistons, and a control pressure Pc of the control chamber that houses the swash plate, by means of the capacity control valve V to be driven to open and close by electromagnetic force. Thereby, the stroke amount of the pistons is changed to control the discharge amount of the fluid.

As shown in FIG. 1, in the capacity control valve V assembled into the variable displacement compressor, electric current which energizes a coil 86 forming the solenoid 80 is adjusted, opening and closing control of a pilot valve 52 in the capacity control valve V is performed, the differential pressure applied to a CS valve body reaches a predetermined value or less, and the opening degree of a CS valve 50 is adjusted, and thereby the fluid flowing out from the control chamber to the suction chamber is controlled, so that the control pressure Pc in the control chamber is variably controlled. Incidentally, the control pressure Pc in the control chamber can be raised by always supplying a discharge fluid of the discharge pressure Pd of the discharge chamber to the control chamber via the fixed orifice 9 and closing the CS valve 50 in the capacity control valve V.

In the present embodiment, the CS valve body includes a hollow cylindrical body 51 with an outer flange (hereinafter, simply referred to as a hollow cylindrical body 51), and a ring 54 that is externally inserted and integrally fixed to an axially left end portion of the hollow cylindrical body 51 in an airtight manner. The CS valve 50 is formed of the ring 54 forming the CS valve body and a CS valve seat 10a formed at an opening end edge on an axially left side of the valve housing 10. A tapered abutting portion 54a formed at an axially right end of the ring 54 comes into contact with and separates from the CS valve seat 10a to open and close the CS valve 50. The pilot valve 52 is formed of a rod 53 serving as a pilot valve body and a pilot valve seat 82a formed at an axially left end of a center post 82 serving as a guide member. An abutting portion 53a formed in an axially left end portion of the rod 53 comes into contact with and separates from the pilot valve seat 82a to open and close the pilot valve 52.

Next, a structure of the capacity control valve V will be described. As shown in FIG. 1, the capacity control valve V mainly includes the valve housing 10 made of a metallic material or a resin material; a hollow cylindrical body 51, the ring 54, the rod 53 disposed in the valve housing 10 so as to be reciprocatable in an axial direction; and the solenoid 80 that is connected to the valve housing 10 and exerts driving force on the rod 53. Incidentally, in the present embodiment, the rod 53 forms a part of the solenoid 80.

As shown in FIG. 1, the solenoid 80 mainly includes a casing 81 including an opening portion 81a that is open to the left in the axial direction; a center post 82 that has a substantially cylindrical shape and is inserted into the opening portion 81a of the casing 81 from the left in the axial direction and fixed on a radially inner side of the casing 81; the rod 53 which is inserted into the center post 82 and reciprocatable in the axial direction and in which the abutting portion 53a formed in the axially left end portion of the rod 53 is disposed on the left in the axial direction of the pilot valve seat 82a; a movable iron core 84 to which an axially right end portion of the rod 53 is inserted and fixed; a coil spring 85 provided between the center post 82 and the movable iron core 84 to bias the movable iron core 84 to the right in the axial direction which is a valve closing direction of the pilot valve 52; and the coil 86 for excitation wound on an outer side of the center post 82 via a bobbin.

A recessed portion 81b in which a radially inner side of an axially left end is recessed to the right in the axial direction is formed in the casing 81. An axially right end portion of the valve housing 10 is inserted and fixed to the recessed portion 81b in a substantially sealed manner.

The center post 82 is made of a rigid body that is a magnetic material such as iron or silicon steel, and includes a cylindrical portion 82b in which an insertion hole 82c is formed into which the rod 53 extending in the axial direction is inserted; a flange portion 82d having an annular shape and extending from an outer peripheral surface of an axially left end portion of the cylindrical portion 82b in a radially outward direction; and a cylindrical guide portion 82e serving as a guide member having a small diameter and extending from an axially left end of the cylindrical portion 82b to the left in the axial direction. Incidentally, the insertion hole 82c formed in the cylindrical portion 82b penetrates through the cylindrical portion 82b to the inside of the cylindrical guide portion 82e in the axial direction. The cylindrical guide portion 82e is provided with a communication hole 82f penetrating through the cylindrical guide portion 82e in the radial direction, and communicating with the insertion hole 82c. In addition, a range of the rod 53 inserted into the cylindrical guide portion 82e has a constricted shape in which the range of the rod 53 has a smaller diameter than the abutting portion 53a, and thereby the cross-sectional area of a flow passage in the cylindrical guide portion 82e is increased.

In addition, the center post 82 is inserted and fixed to the axially right end portion of the valve housing 10, which is inserted and fixed to the recessed portion 81b of the casing 81, in a substantially sealed manner in a state where an axially right end surface of the flange portion 82d is abutted against a bottom surface of the recessed portion 81b of the casing 81 from the left in the axial direction.

Figure 2:
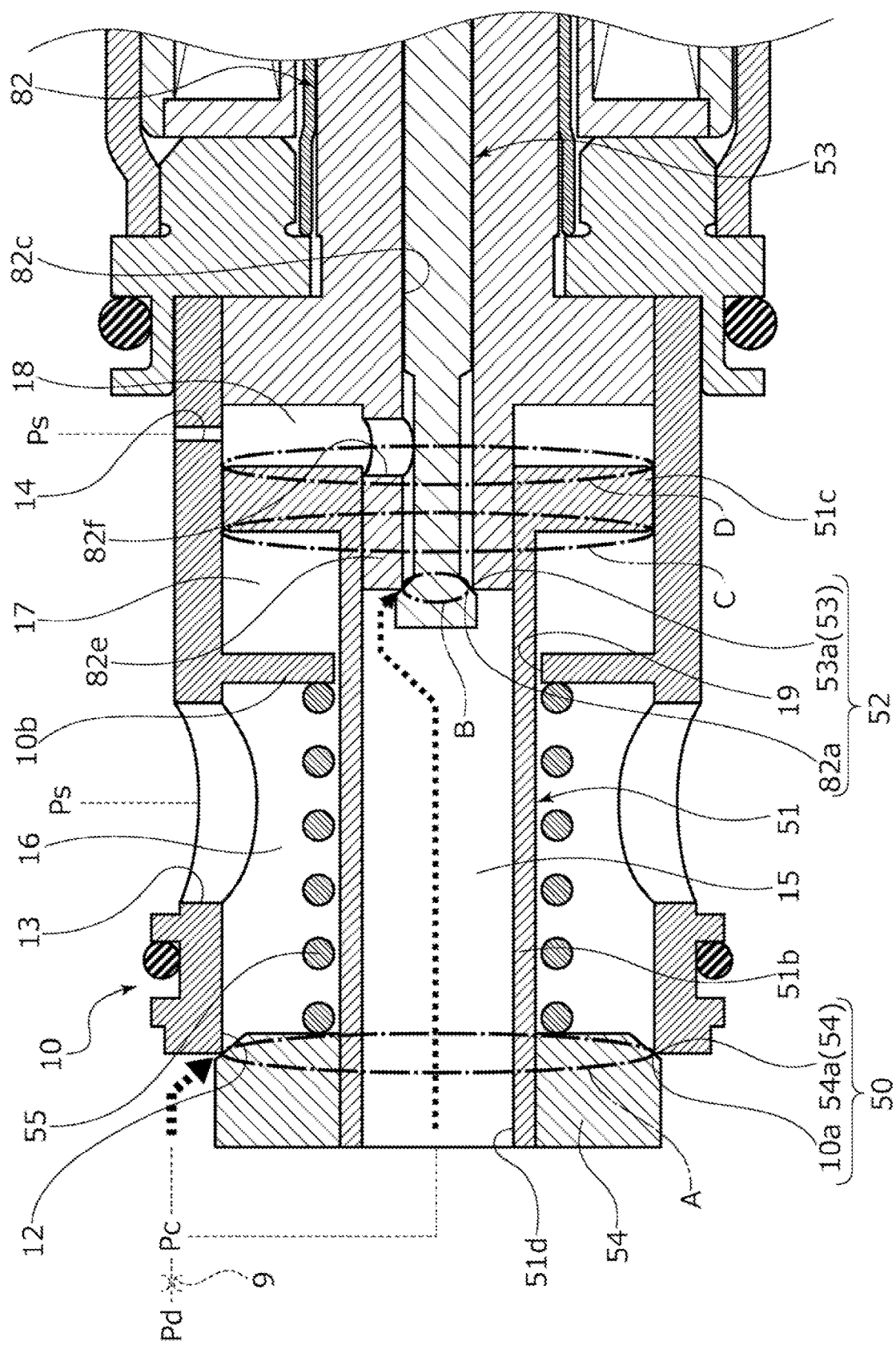
FIG. 2 is a sectional view showing a state where a pilot valve and a CS valve are closed in a non-energized state of the capacity control valve in the first embodiment.
Figure 3:
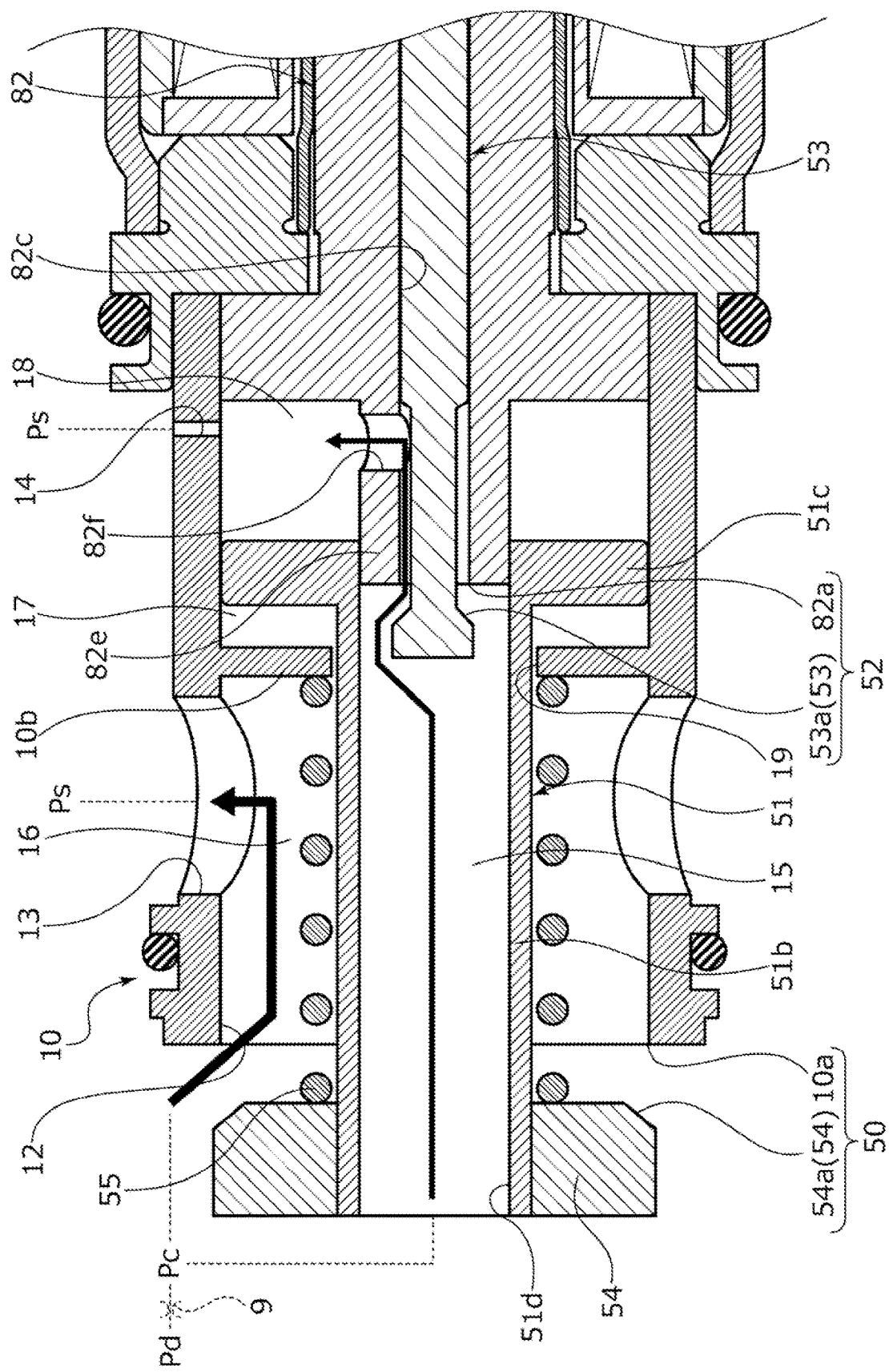
FIG. 3 is a sectional view showing a state where the pilot valve and the CS valve are fully opened in an energized state (e.g., when maximum current is applied) of the capacity control valve in the first embodiment.

As shown in FIGS. 1 to 3, the hollow cylindrical body 51 forming the CS valve body in the first embodiment includes a cylindrical portion 51b and a flange portion 51c having an annular shape and extending from an outer peripheral surface of an axially right end portion of the cylindrical portion 51b in the radially outward direction. The axially right end portion of the cylindrical portion 51b is externally fitted to the cylindrical guide portion 82e of the center post 82. An inner peripheral surface of the cylindrical portion 51b is slidable on an outer peripheral surface of the cylindrical guide portion 82e in a substantially sealed state. In addition, an outer peripheral surface of the flange portion 51c is slidable on an inner peripheral surface of the valve housing 10 in a substantially sealed state. Incidentally, an opening portion 51d of an axially left end of the hollow cylindrical body 51 and the ring 54 are disposed in an external space S communicating with the control chamber of the variable displacement compressor. A control fluid supply chamber 15 to which the control fluid is supplied is provided inside the cylindrical portion 51b. Incidentally, the control fluid supply chamber 15 inside the cylindrical portion 51b and the space S in which the ring 54 is disposed correspond to one space in the present invention.

In addition, an inner peripheral surface of the cylindrical portion 51b of the hollow cylindrical body 51 and the outer peripheral surface of the cylindrical guide portion 82e of the center post 82 are slightly separated from each other in a radial direction, and thereby a very small gap is formed therebetween. The hollow cylindrical body 51 is smoothly movable relatively with respect to the cylindrical guide portion 82e of the center post 82 in the axial direction, and the gap functions as a clearance seal that divides the control fluid supply chamber 15 from a third suction fluid supply chamber 18 serving as the other space to be described later in a substantially sealed manner.

In addition, a coil spring 55 serving as biasing means is externally fitted to the hollow cylindrical body 51. Incidentally, an axially left end of the coil spring 55 abuts against an axially right end surface of the ring 54 externally inserted and integrally fixed to an axially left end portion of the cylindrical portion 51b of the hollow cylindrical body 51, and an axially right end of the coil spring 55 abuts against an axially left end surface of a partition wall 10b formed in a substantially axially central portion of the valve housing 10, and thereby the hollow cylindrical body 51 and the ring 54 are biased to the left in the axial direction which is a valve opening direction of the CS valve 50. In addition, the coil spring 55 is a compression spring. In such a manner, since the coil spring 55 is externally fitted to the hollow cylindrical body 51 to be guided by the hollow cylindrical body 51, the movement and the deformation of the coil spring 55 in the radial direction are unlikely to occur.

The ring 54 forming the CS valve body in the first embodiment has a disk shape, and the outer diameter of the ring 54 is made larger than the inner diameter of the valve housing 10. In addition, the tapered abutting portion 54a is formed in an outer diameter portion of the axially right end surface of the ring 54, and a radially inner side of the abutting portion 54a faces a first suction fluid supply chamber 16 to be described later provided inside the valve housing 10. In addition, an axially left end surface of the ring 54 faces the external space S (refer to FIG. 1) communicating with the control chamber of the variable displacement compressor.

As shown in FIGS. 1 to 3, a Pc port 12 communicating with the control chamber of the variable displacement compressor, a Ps port 13 communicating with the suction chamber of the variable displacement compressor, and an orifice 14 communicating with the suction chamber of the variable displacement compressor are formed in the valve housing 10. Incidentally, the orifice 14 is formed on an axially right side of the Ps port 13, in detail, the inner peripheral surface of the valve housing 10 which is slidable on the outer peripheral surface of the flange portion 51c of the hollow cylindrical body 51.

The valve housing 10 has a cylindrical shape, and the CS valve seat 10a is provided in an opening edge portion on the axially left side. In addition, inside the valve housing 10, there are provided: the first suction fluid supply chamber 16 to which the suction fluid is supplied from the Ps port 13 on an outer periphery of the cylindrical portion 51b of the hollow cylindrical body 51 and which is partitioned off to an axially left side of the partition wall 10b; a second suction fluid supply chamber 17 to which the suction fluid is supplied from the first suction fluid supply chamber 16 and which is partitioned off to an axially right side of the partition wall 10b; the third suction fluid supply chamber 18 to which the suction fluid is supplied from the orifice 14 on an outer periphery of the cylindrical guide portion 82e of the center post 82 and which is partitioned off to an axially right side of the flange portion 51c of the hollow cylindrical body 51; and a communication hole 19 axially penetrating through the center of the partition wall 10b extending in the radial between the first suction fluid supply chamber 16 and the second suction fluid supply chamber 17. Incidentally, the first suction fluid supply chamber 16 is defined by the inner peripheral surface of the valve housing 10 on the axially left side of the partition wall 10b, an outer peripheral surface of the cylindrical portion 51b of the hollow cylindrical body 51, an axially left surface of the partition wall 10b, and the axially right end surface of the ring 54. In addition, the coil spring 55 which biases the hollow cylindrical body 51 forming the CS valve body and the ring 54 to the left in the axial direction is disposed in the first suction fluid supply chamber 16.

The second suction fluid supply chamber 17 is defined by the inner peripheral surface of the valve housing 10 on the axially right side of the partition wall 10b, the outer peripheral surface of the cylindrical portion 51b of the hollow cylindrical body 51, an axially right surface of the partition wall 10b, and an axially left surface of the flange portion 51c of the hollow cylindrical body 51.

In addition, an inner peripheral surface of the communication hole 19 provided in the partition wall 10b of the valve housing 10 and the outer peripheral surface of the cylindrical portion 51b of the hollow cylindrical body 51 are separated from each other in the radial direction, and thereby a gap is formed therebetween. The gap functions as a communication passage that allows communication between the first suction fluid supply chamber 16 and the second suction fluid supply chamber 17.

The third suction fluid supply chamber 18 is defined by the inner peripheral surface of the valve housing 10 on the axially right side of the partition wall 10b, the outer peripheral surface of the cylindrical guide portion 82e of the center post 82, an axially left surface of the flange portion 82d of the center post 82, and an axially right surface of the flange portion 51c of the hollow cylindrical body 51. Incidentally, the third suction fluid supply chamber 18 communicates with the insertion hole 82c in the cylindrical portion 82b via the communication hole 82f provided in the cylindrical guide portion 82e of the center post 82.

In addition, the inner peripheral surface of the valve housing 10 and the outer peripheral surface of the flange portion 51c of the hollow cylindrical body 51 are slightly separated from each other in the radial direction, and thereby a very small gap is formed therebetween. The hollow cylindrical body 51 is smoothly movable relatively with respect to the valve housing 10 in the axial direction, and the gap functions as a clearance seal that divides the second suction fluid supply chamber 17 from the third suction fluid supply chamber 18 in a substantially sealed manner.

Next, the operation of the capacity control valve V, namely, the opening and closing operation of the pilot valve 52 and the CS valve 50 will be described.

First, a non-energized state of the capacity control valve V will be described. As shown in FIGS. 1 and 2, when the capacity control valve V is in a non-energized state, the rod 53 is pressed to the right in the axial direction by biasing force of the coil spring 85 forming the solenoid 80, so that the abutting portion 53a of the rod 53 is seated on the pilot valve seat 82a to close the pilot valve 52. In addition, the hollow cylindrical body 51 and the ring 54 forming the CS valve body are pressed to the right in the axial direction against biasing force of the coil spring 55 by force induced by the control pressure Pc in the external space S (refer to FIG. 1) applied to the axially left end surface of the ring 54, the external space S communicating with the control chamber of the variable displacement compressor, so that the abutting portion 54a of the ring 54 is seated on the CS valve seat 10a to close the CS valve 50.

At this time, the biasing force $F_{sp1}$ of the coil spring 85 toward the right in the axial direction and force $F_{P15}$ induced by the control pressure Pc applied according to a pressure receiving seal diameter B (refer to FIG. 2) in the pilot valve 52 to which the control fluid in the control fluid supply chamber 15 is applied are applied to the rod 53. Force $F_{P18}$ induced by the suction pressure Ps applied toward the left in the axial direction according to the pressure receiving seal diameter B in the pilot valve 52 to which the suction fluid in the third suction fluid supply chamber 18 is applied is applied to the rod 53. Namely, force $F_{rod1} = F_{sp1} + F_{P15} - F_{P18}$ is applied to the rod 53, given that a right direction is positive.

In addition, force induced by the control pressure Pc applied toward the right in the axial direction according to a pressure receiving seal diameter A (refer to FIG. 2) in the CS valve 50 to which the control fluid is applied, in other words, force $F_{P15+5}$ induced by the control pressure Pc of the control fluid of the space S in which the control fluid supply chamber 15 and the ring 54 are disposed, and force $F_{P17}$ induced by the suction pressure Ps applied according to a pressure receiving seal diameter C (refer to FIG. 2) in the clearance seal between the inner peripheral surface of the valve housing 10 and the outer peripheral surface of the flange portion 51c of the hollow cylindrical body 51 to which the suction fluid in the second suction fluid supply chamber 17 is applied are applied to the hollow cylindrical body 51 and the ring 54 forming the CS valve body. The biasing force $F_{sp2}$ of the coil spring 55 toward the left in the axial direction, force $F_{P16}$ induced by the suction pressure Ps applied according to the pressure receiving seal diameter A in the CS valve 50 to which the suction fluid in the first suction fluid supply chamber 16 is applied, and the force $F_{P18}$ induced by pressure applied according to a pressure receiving seal diameter D (refer to FIG. 2) in the clearance seal between the inner peripheral surface of the valve housing 10 and the outer peripheral surface of the flange portion 51c of the hollow cylindrical body 51 to which the fluid in the third suction fluid supply chamber 18 is applied are applied to the hollow cylindrical body 51 and the ring 54. Namely, force $F_{rod2}=F_{P15+S}+F_{P17}-F_{P16}-F_{P18}-F_{sp2}$ is applied to the hollow cylindrical body 51 and the ring 54 forming the CS valve body, given that the right direction is positive.

Incidentally, in the first embodiment, the pressure receiving seal diameter A to which the control fluid of the space S in which the control fluid supply chamber 15 and the ring 54 are disposed is applied, the pressure receiving seal diameter C to which the suction fluid in the second suction fluid supply chamber 17 is applied, and the pressure receiving seal diameter D to which the fluid in the third suction fluid supply chamber 18 is applied are the same (i.e., A=C=D).

In such a manner, since the fluid flowing into the first suction fluid supply chamber 16, the second suction fluid supply chamber 17, and the third suction fluid supply chamber 18 is the same as the suction fluid to be supplied from the Ps port 13 and the orifice 14, and the pressure receiving seal diameters A, C, and D of the hollow cylindrical body 51 and the ring 54 forming the CS valve body are the same, the force $F_{P16}$ induced by the suction pressure Ps applied to the axially right end surface of the ring 54 and the force $F_{P17}$ induced by the suction pressure Ps applied to the axially left end surface of the flange portion 51c of the hollow cylindrical body 51 are the same (i.e., $F_{P16}=F_{P17}$). Therefore, the force $F_{P16}$ induced by the pressure of the fluid and the force $F_{P17}$ induced by the pressure of the fluid are cancelled. Namely, practically, the force $F_{rod2}=F_{P15+S}-F_{P18}-F_{sp2}$ is applied to the hollow cylindrical body 51 and the ring 54 forming the CS valve body, given that the right direction is positive.

Next, an energized state of the capacity control valve V will be described. Here, particularly, as shown in FIG. 3, an operation in which the CS valve 50 is fully opened in a maximum energized state of the capacity control valve V will be described. When electromagnetic force $F_{sol}$ generated by the application of electric current to the solenoid 80 exceeds the force $F_{rod1}$ (i.e., $F_{sol}>F_{rod1}$), the movable iron core 84 is pulled toward the axially left side, namely, toward a center post 82 side, and the rod 53 fixed to the movable iron core 84 moves to the left in the axial direction, and thereby the abutting portion 53a of the rod 53 separates from the pilot valve seat 82a of the center post 82 to fully open the pilot valve 52. Accordingly, the fluid in the control fluid supply chamber 15 is introduced into the third suction fluid supply chamber 18 through the insertion hole 82c and the communication hole 82f which are formed in the cylindrical guide portion 82e of the center post 82, and the pressure of the fluid in the third suction fluid supply chamber 18 rises.

When the pressure of the fluid in the third suction fluid supply chamber 18 is raised by the opening of the pilot valve 52, and the differential pressure between the pressure of the fluid in the control fluid supply chamber 15 and the pressure of the fluid in the third suction fluid supply chamber 18 reaches a predetermined value or less, namely, the resultant force of the force $F_{P18}$ induced by the pressure of the fluid applied to the hollow cylindrical body 51 and the ring 54 forming the CS valve body to the left in the axial direction and the biasing force $F_{sp2}$ of the coil spring 55 exceeds the force $F_{P15+S}$ induced by the control pressure Pc of the control fluid applied to the ring 54 forming the CS valve body to the right in the axial direction (i.e., $F_{P15+S}<F_{P18}+F_{sp2}$), the abutting portion 54a of the ring 54 separates from the CS valve seat 10a of the valve housing 10, and thereafter, the hollow cylindrical body 51 and the ring 54 move to the left in the axial direction, and the movable iron core 84 abuts against the center post 82 (refer to FIG. 1), so that movement to the left in the axial direction is restricted and the CS valve 50 is fully opened.

In addition, even when the capacity control valve V is in an energized state, namely, at the time of normal control, in other words, at the time of so-called duty control, the pilot valve 52 is slightly opened with low electric current, the pressure in the third suction fluid supply chamber 18 is raised, and the differential pressure applied to the hollow cylindrical body 51 and the ring 54 forming the CS valve body is the predetermined value or less, and thereby the hollow cylindrical body 51 and the ring 54 can be stroked more than the stroke width of the rod 53 by driving force of the solenoid 80 to open CS valve 50. In such a manner, the opening degree of the CS valve 50 is adjustable according to the opening degree of the pilot valve 52.

In addition, since the capacity control valve V performs Pc–Ps control to open and close the CS valve 50 so that the control fluid of the control pressure Pc supplied from the Pc port 12 is supplied to the suction chamber via the Ps port 13 and the control pressure Pc of the control chamber is lowered, namely, since the discharge fluid of the discharge pressure Pd which is a high pressure is not directly controlled, the control pressure Pc can be finely adjusted by the valve opening degree of the CS valve 50 to be adjusted by balancing between the electromagnetic force of the solenoid 80 and the differential pressure applied to the hollow cylindrical body 51 and the ring 54 forming the CS valve body.

As described above, in the capacity control valve V, when the pilot valve 52 to be driven by the solenoid 80 is opened, the pressure in the third suction fluid supply chamber 18 is raised, and the differential pressure applied to the hollow cylindrical body 51 and the ring 54 forming the CS valve body reaches the predetermined value or less, the CS valve 50 is opened. Therefore, the driving electric power of the solenoid 80 can be reduced, and the valve opening degree of the CS valve 50 can be increased. In such a manner, since the opening degree of the CS valve 50 can be increased, even when the target value is large, a large flow rate can be promptly supplied, and the variable displacement compressor can be controlled with good response.

In addition, since the orifice 14 discharges the fluid in the third suction fluid supply chamber 18 toward the suction chamber of the variable displacement compressor in which an external suction fluid is housed, the fluid can be circulated in a closed system.

In addition, the opening degree of the pilot valve 52 is adjustable by adjusting electric current that energizes the solenoid 80, and thereby the pressure of the fluid in the third suction fluid supply chamber 18 is adjustable, so that the opening degree of the CS valve 50 is adjustable.

In addition, since the CS valve body includes the hollow cylindrical body 51 with an outer flange, and the flange portion 51c of the hollow cylindrical body 51 slides on the inner peripheral surface of the valve housing 10, the suction fluid supplied from the orifice 14 to the third suction fluid supply chamber 18 can be kept in a substantially sealed state by the clearance seal formed between the inner peripheral surface of the valve housing 10 and the outer peripheral surface of the flange portion 51c of the hollow cylindrical body 51. In other words, since the suction fluid is easily maintained in the third suction fluid supply chamber 18, in a non-energized state of the capacity control valve V, it is easy to maintain the differential pressure between the control fluid supply chamber 15 and the third suction fluid supply chamber 18 at a predetermined value or more, and maintain a valve closed state of the CS valve 50. In addition, since the control fluid supply chamber 15, the second suction fluid supply chamber 17, and the third suction fluid supply chamber 18 are divided from each other in a substantially sealed manner by the clearance seal formed between the inner peripheral surface of the valve housing 10 and the outer peripheral surface of the flange portion 51c of the hollow cylindrical body 51 and the clearance seal formed between the inner peripheral surface of the cylindrical portion 51b of the hollow cylindrical body 51 and the outer peripheral surface of the cylindrical guide portion 82e of the center post 82, there is no need to separately prepare a member that divides the control fluid supply chamber 15, the second suction fluid supply chamber 17, and the third suction fluid supply chamber 18 from each other, the number of components is reduced, and the structure of the capacity control valve V can be simplified.

In addition, since the outer peripheral surface of the flange portion 51c of the hollow cylindrical body 51 slides on the inner peripheral surface of the valve housing 10, and the inner peripheral surface of the cylindrical portion 51b of the hollow cylindrical body 51 slides on the outer peripheral surface of the cylindrical guide portion 82e of the center post 82, the hollow cylindrical body 51 is guided by the inner peripheral surface of the valve housing 10 and the outer peripheral surface of the cylindrical guide portion 82e of the center post 82, and thereby the accuracy of operation of the hollow cylindrical body 51 and the ring 54 forming the CS valve body can be improved.

In addition, since the orifice 14 is provided in the valve housing 10, the structure can be such that the orifice is not provided in the hollow cylindrical body 51 or the ring 54 forming the CS valve body, so that the hollow cylindrical body 51 and the ring 54 are unlikely to be tilted and are smoothly movable, and the capacity control valve V can be compactly configured.

In addition, since the coil spring 55 which biases the hollow cylindrical body 51 and the ring 54 to the left in the axial direction which is the valve opening direction of the CS valve 50 is disposed in the first suction fluid supply chamber 16 into which the suction fluid flows through the Ps port 13 on the outer periphery of the cylindrical portion 51b of the hollow cylindrical body 51 forming the CS valve body, a space in which the coil spring 55 is disposed is not required to be secured on a solenoid 80 side, and the capacity control valve V can be compactly configured. In addition, since the coil spring 55 is disposed on a side opposite to the solenoid 80 with the partition wall 10b of the valve housing 10 interposed therebetween, the operation of the hollow cylindrical body 51 and the ring 54 can be stabilized.

In addition, since the coil spring 55 is provided which biases the hollow cylindrical body 51 and the ring 54 to the left in the axial direction which is the valve opening direction of the CS valve 50, when the control pressure Pc of the control fluid and the suction pressure Ps of the suction fluid are equal, the CS valve 50 can be opened. Therefore, when the variable displacement compressor is started after being stopped for a long period of time, the pressure of the control fluid can be promptly lowered.

In addition, since the pilot valve seat 82a is formed in the control fluid supply chamber 15, and the control pressure Pc in the control fluid supply chamber 15 is applied to the axially left end portion of the rod 53 to the right in the axial direction which is the valve closing direction of the pilot valve 52, the pilot valve 52 can be prevented from being opened when the solenoid 80 is not energized.

In addition, since the CS valve body is formed of the hollow cylindrical body 51 with an outer flange, and the ring 54 that is externally inserted and fixed to the hollow cylindrical body 51 of the CS valve body in an airtight manner and includes the abutting portion 54a which abuts against the CS valve seat 10a of the valve housing 10, the CS valve 50 can be easily assembled and configured while securing a large flow rate of the fluid in the CS valve 50.

Incidentally, in the first embodiment, a mode has been provided as an example in which the pressure receiving seal diameter A to which the control fluid of the space S in which the control fluid supply chamber 15 and the ring 54 are disposed is applied, the pressure receiving seal diameter C to which the suction fluid in the second suction fluid supply chamber 17 is applied, and the pressure receiving seal diameter D to which the fluid in the third suction fluid supply chamber 18 is applied are the same (i.e., A=C=D); however, the pressure receiving seal diameter A may be set slightly larger than the pressure receiving seal diameters C and D (i.e., A>C=D) to facilitate bringing the CS valve 50 into a closed state, or the pressure receiving seal diameter A may be set slightly smaller than the pressure receiving seal diameters C and D (i.e., A<C=D) to facilitate bringing the CS valve 50 into an open state. In such a manner, needless to say, the pressure receiving seal diameters A and B can be appropriately modified according to the application.

Second Embodiment

A capacity control valve according to a second embodiment of the present invention will be described with reference to FIG. 4. Incidentally, description of the same and duplicated configurations as the configurations of the first embodiment will be omitted.

Figure 4:
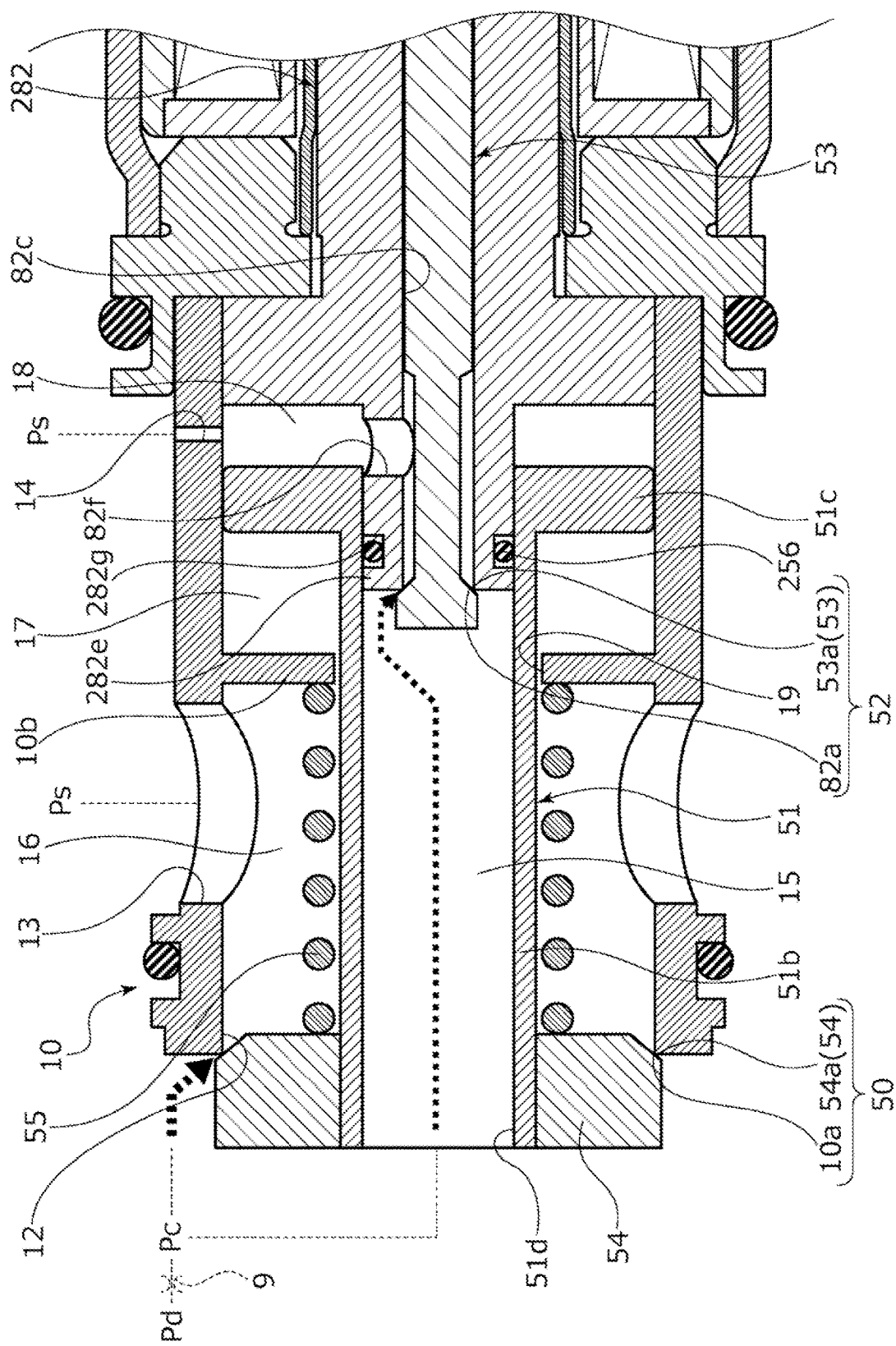
FIG. 4 is a sectional view showing a structure of a CS valve of a capacity control valve according to a second embodiment of the present invention.

As shown in FIG. 4, in the second embodiment of the present invention, an annular groove 282g which is recessed in a radially inward direction on an axially left side of the communication hole 82f is formed in an outer peripheral surface of a cylindrical guide portion 282e of a center post 282, and an O-ring 256 made of rubber or resin and serving as an elastic seal member is disposed in the annular groove 282g. In addition, the O-ring 256 and the inner peripheral surface of the cylindrical portion 51b of the hollow cylindrical body 51 are slidable on each other. Incidentally, the elastic seal member is not limited to the O-ring made of rubber or resin, and may be, for example, a rectangular ring, a D-ring, an X-ring, a T-ring, a lip packing, etc. made of rubber or resin.

According to this configuration, since sealing performance between the control fluid supply chamber 15 to which the control fluid is supplied and the third suction fluid supply chamber 18 to which the suction fluid is supplied can be improved by disposing the O-ring 256, which is provided in the annular groove 282g of the cylindrical guide portion 282e, between the inner peripheral surface of the cylindrical portion 51b of the hollow cylindrical body 51 and the outer peripheral surface of the cylindrical guide portion 282e of the center post 282, in a non-energized state of the capacity control valve V, it is easy to maintain the differential pressure between the control fluid supply chamber 15 and the third suction fluid supply chamber 18 at a predetermined value or more, and maintain the CS valve 50 in a valve closed state. Incidentally, the elastic seal member may be provided on a hollow cylindrical body 51 side.

Third Embodiment

A capacity control valve according to a third embodiment of the present invention will be described with reference to FIG. 5. Incidentally, description of the same and duplicated configurations as the configurations of the first embodiment will be omitted.

Figure 5:
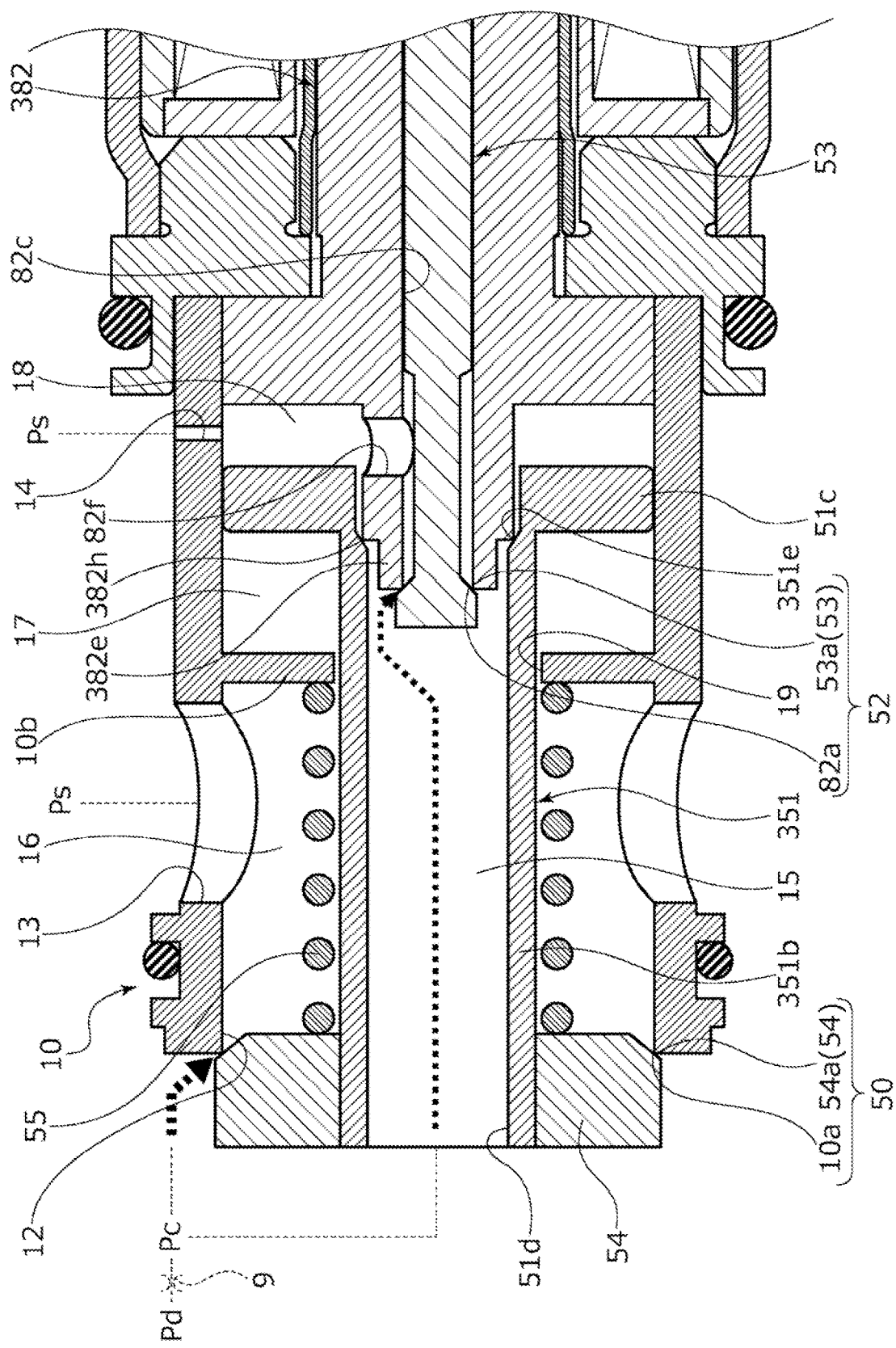
FIG. 5 is a sectional view showing a structure of a CS valve of a capacity control valve according to a third embodiment of the present invention.

As shown in FIG. 5, in the third embodiment of the present invention, in a hollow cylindrical body 351, the inner diameter of the vicinity of an opening edge portion of an axially right end portion of a cylindrical portion 351b in which the flange portion 51c is formed is made large, and a tapered annular step portion 351e is formed on an axially left side of the opening edge portion.

In addition, an annular step portion 382h extending vertically in the radially inward direction is provided in a tip portion of a cylindrical guide portion 382e of a center post 382 in such a manner that an outer peripheral surface of the tip portion on the axially left side of the communication hole 82f is formed to have a small diameter, and in a non-energized state of the capacity control valve V, a corner of the annular step portion 382h and the annular step portion 351e of the hollow cylindrical body 351 can abut against each other.

According to this configuration, since a complementary step is formed of the tapered annular step portion 351e of the hollow cylindrical body 351 and the annular step portion 382h formed in the tip portion of the cylindrical guide portion 382e of the center post 382, and a poppet structure is adopted in which the annular step portion 382h abuts against the tapered annular step portion 351e of the hollow cylindrical body 351 at a right angle, in a non-energized state of the capacity control valve V, sealing performance between the control fluid supply chamber 15 to which the control fluid is supplied and the third suction fluid supply chamber 18 to which the suction fluid is supplied can be improved.

Therefore, it is easy to maintain the differential pressure between the control fluid supply chamber 15 and the third suction fluid supply chamber 18 at a predetermined value or more, and maintain the CS valve 50 in a valve closed state.

Fourth Embodiment

A capacity control valve according to a fourth embodiment of the present invention will be described with reference to FIG. 6. Incidentally, description of the same and duplicated configurations as the configurations of the first embodiment will be omitted.

Figure 6:
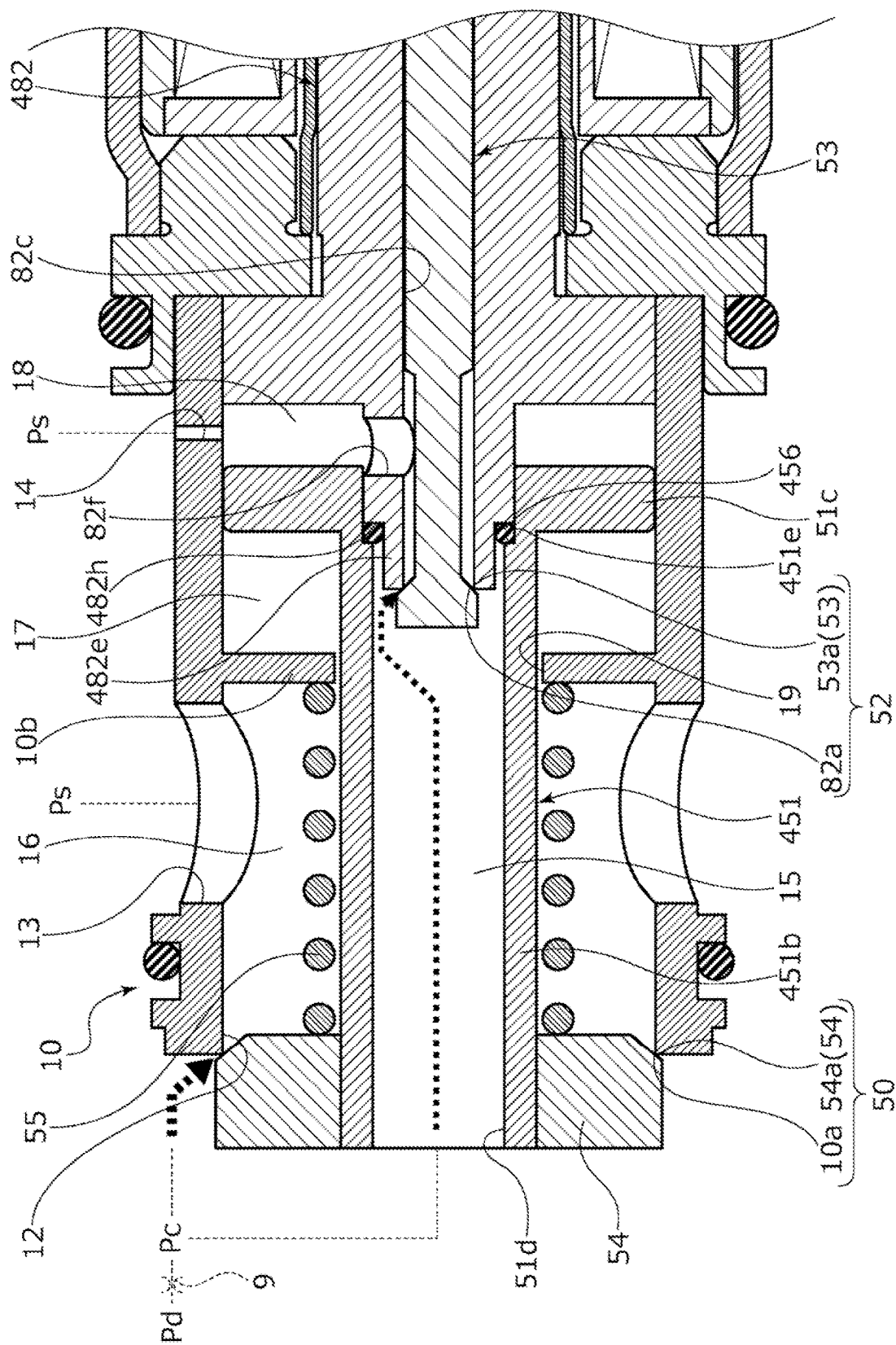
FIG. 6 is a sectional view showing a structure of a CS valve of a capacity control valve according to a fourth embodiment of the present invention.

As shown in FIG. 6, in the fourth embodiment, in a hollow cylindrical body 451, the inner diameter of the vicinity of an opening edge portion of an axially right end portion of a cylindrical portion 451b in which the flange portion 51c is formed is made large, and an annular step portion 451e extending vertically is formed on an axially left side of the opening edge portion.

In addition, an annular step portion 482h extending vertically in the radially inward direction is provided in a tip portion of a cylindrical guide portion 482e of a center post 482 in such a manner that an outer peripheral surface of the tip portion on the axially left side of the communication hole 82f is formed to have a small diameter, and an O-ring 456 made of rubber or resin and serving as an elastic seal member is externally fitted to and disposed on an axially left side of the annular step portion 482h. Incidentally, in a non-energized state of the capacity control valve V, the O-ring 456 and the annular step portion 451e of the hollow cylindrical body 451 can abut against each other.

According to this configuration, since a complementary step is formed of the annular step portion 451e of the hollow cylindrical body 451 and the annular step portion 482h formed in the tip portion of the cylindrical guide portion 482e of the center post 482, and the O-ring 456 is interposed between the annular step portion 451e of the hollow cylindrical body 451 and a side surface on the axially left side of the annular step portion 482h of the cylindrical guide portion 482e, in a non-energized state of the capacity control valve V, sealing performance between the control fluid supply chamber 15 to which the control fluid is supplied and the third suction fluid supply chamber 18 to which the suction fluid is supplied can be improved, and it is easy to maintain the differential pressure between the control fluid supply chamber 15 and the third suction fluid supply chamber 18 at a predetermined value or more, and maintain the CS valve 50 in a valve closed state.

Fifth Embodiment

A capacity control valve according to a fifth embodiment of the present invention will be described with reference to FIG. 7. Incidentally, description of the same and duplicated configurations as the configurations of the first embodiment will be omitted.

Figure 7:
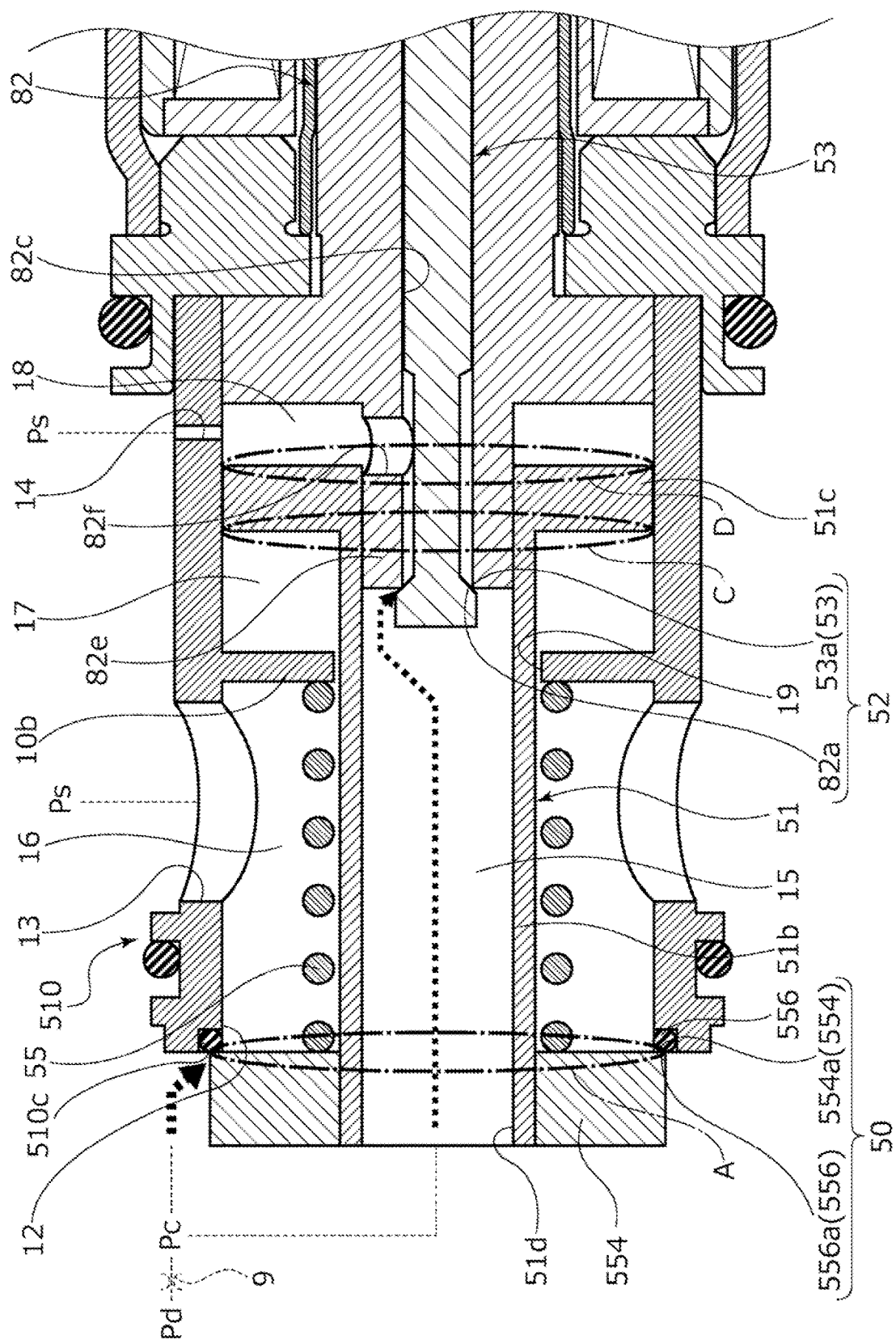
FIG. 7 is a sectional view showing a structure of a CS valve of a capacity control valve according to a fifth embodiment of the present invention.

As shown in FIG. 7, in the fifth embodiment of the present invention, a ring 554 forming the CS valve body has a cylindrical shape, and the outer diameter of the ring 554 is made larger than the inner diameter of a valve housing 510. In addition, a right-angled abutting portion 554a is formed in an outer diameter portion of an axially right end surface of the ring 554.

In addition, an annular recessed portion 510c is provided in an axially left end portion of the valve housing 510 in which the Pc port 12 is formed by causing an opening edge portion of the axially left end portion to be recessed to the right in the axial direction, and an O-ring 556 made of rubber or resin and serving as an elastic body is disposed in the annular recessed portion 510c. In addition, the O-ring 556 forms a CS valve seat 556a from which the abutting portion 554a of the ring 554 forming the CS valve body comes into contact with and separates. Incidentally, the elastic body is not limited to the O-ring made of rubber or resin, and may be, for example, a rectangular ring or an X-ring made of rubber or resin, a C-ring made of metal, etc.

According to this configuration, in the CS valve 50, since the O-ring 556 forms the CS valve seat 556a with which the abutting portion 554a of the ring 554 comes into contact with and separates, the CS valve 50 can be reliably closed.

Incidentally, since the fifth embodiment has a configuration in which the pressure receiving seal diameter A to which the control fluid of the space S (refer to FIG. 1) in which the control fluid supply chamber 15 and the ring 54 are disposed is larger than the pressure receiving seal diameter C to which the suction fluid in the second suction fluid supply chamber 17 is applied and the pressure receiving seal diameter D to which the pressure of the fluid in the third suction fluid supply chamber 18 is applied (i.e., A>C=D), the CS valve 50 is easily maintained in a closed state in a non-energized state of the capacity control valve V.

The embodiments of the present invention have been described above with reference to the drawings; however, the specific configuration is not limited to the embodiments, and the present invention also includes changes or additions that are made without departing from the scope of the present invention.

For example, in the embodiments, a mode has been described in which the suction fluid is supplied to the third suction fluid supply chamber 18 through the orifice 14 formed in the valve housing; however, the present invention is not limited to this mode, and an orifice for supplying the suction fluid to the third suction fluid supply chamber 18 may be provided to penetrate through the flange portion of the hollow cylindrical body forming the CS valve body in the axial direction. In addition, in this case, the orifice formed in the flange portion of the hollow cylindrical body is not limited to a through-hole, and may have other shapes such as a cutout. In addition, the orifice may be a variable orifice in which the passage area of the fluid is variable.

Figure 8:
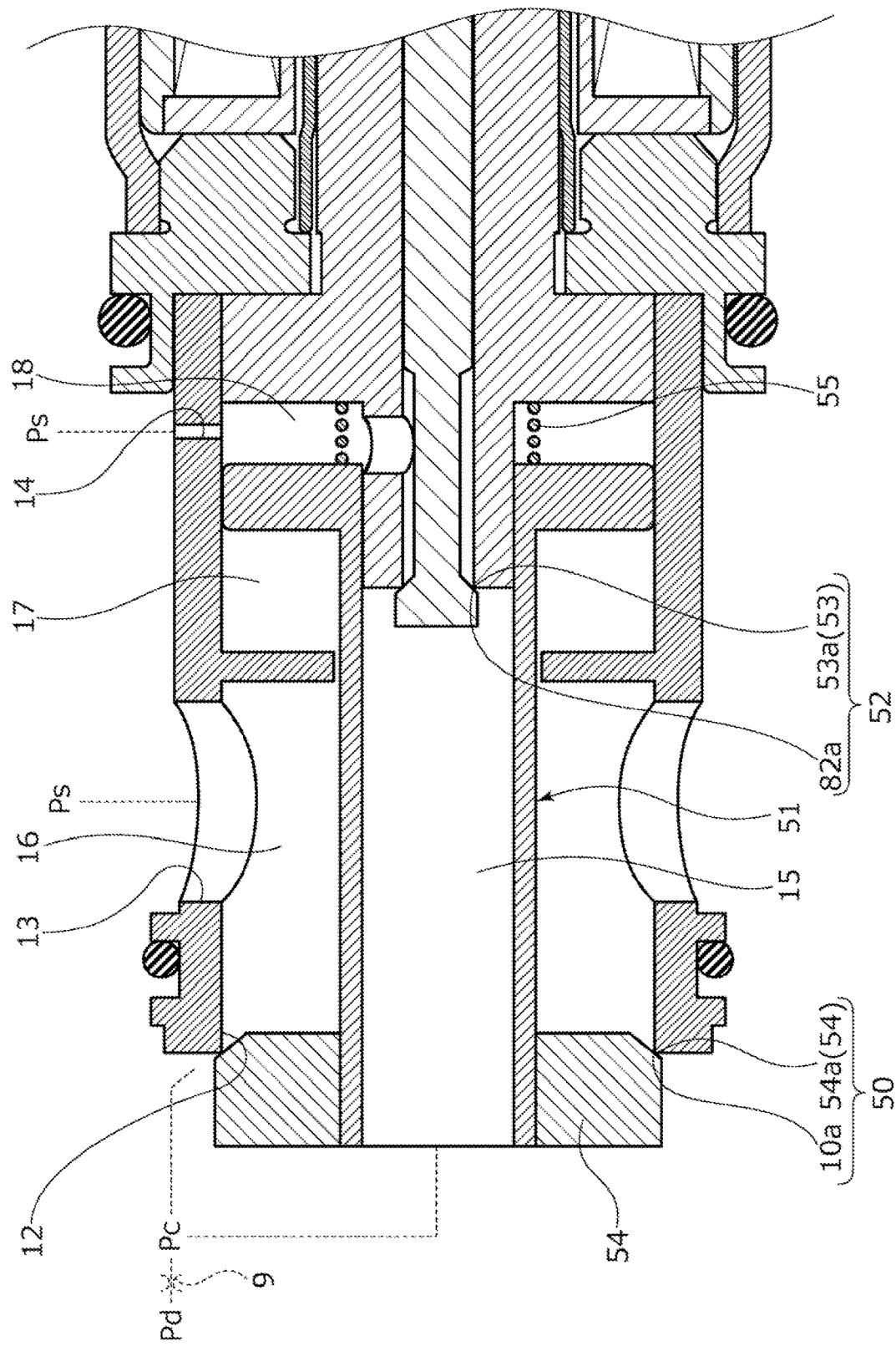
FIG. 8 is a sectional view showing a modification example of disposition of a coil spring in the capacity control valve in the first embodiment.

In addition, in the embodiments, the coil spring 55 serving as biasing means has been described as being disposed in the first suction fluid supply chamber 16; however, the present invention is not limited to this configuration, and for example, the coil spring 55 may be disposed in other places such as in the third suction fluid supply chamber 18 (refer to FIG. 8) as long as the CS valve body can be biased in the valve opening direction of the CS valve 50.

In addition, the hollow cylindrical body with an outer flange and the ring forming the CS valve body may be integrally formed. In addition, the cylindrical portion and the flange portion of the hollow cylindrical body may be separately formed, and the flange portion may be externally inserted and fixed to the axially right end portion of the cylindrical portion in an airtight manner.

REFERENCE SIGNS LIST

9 Fixed orifice
10 Valve housing
10a CS valve seat
12 Pc port
13 Ps port
14 Orifice
15 Control fluid supply chamber (first space)
16 First suction fluid supply chamber
17 Second suction fluid supply chamber
18 Third suction fluid supply chamber (second space)
19 Communication hole
50 CS valve
51 Hollow cylindrical body with outer flange (CS valve body)
51b Cylindrical portion
51c Flange portion
52 Pilot valve
53 Rod (pilot valve body)
53a Abutting portion
54 Ring (CS valve body)
54a Abutting portion
55 Coil spring (biasing member)
80 Solenoid
82 Center post
82a Pilot valve seat
82b Cylindrical portion
82c Insertion hole
82e Cylindrical guide portion (guide member)
82f Communication hole
85 Coil spring
256 O-ring (elastic seal member)
282 Center post
282e Cylindrical guide portion (guide member)
282g Annular groove
351 Hollow cylindrical body with outer flange (CS valve body)
351e Annular step portion
382 Center post
382e Cylindrical guide portion
382h Annular step portion
451 Hollow cylindrical body with outer flange (CS valve body)
451e Annular step portion
456 O-ring (elastic seal member)
482 Center post
482e Cylindrical guide portion (guide member)
482h Annular step portion
510 Valve housing
510c Annular recessed portion
554 Ring (CS valve body)
554a Abutting portion
556 O-ring (elastic body)
556a CS valve seat
Pc Control pressure
Pd Discharge pressure
Ps Suction pressure
S Space (first space)
V Capacity control valve

The invention claimed is:

1. A capacity control valve comprising:
a valve housing to which a suction fluid having a suction pressure and a control fluid having a control pressure are supplied;
a solenoid;
a CS valve formed of a CS valve body that partitions an inside of the valve housing into a first space and a second space and moves according to the suction pressure of the suction fluid and the control pressure of the control fluid, and a CS valve seat with which the CS valve body is configured to come into contact;
a biasing member configured to bias the CS valve body in a valve opening direction of the CS valve; and
a pilot valve formed of a pilot valve body configured to be driven by the solenoid and a pilot valve seat with which the pilot valve body is configured to come into contact,
wherein the control fluid flows into the first space, the suction fluid is flowable into the second space via an orifice, and the control fluid in the first space is introduced into the second space by flowing through an opening of the pilot valve seat.

2. The capacity control valve according to claim 1, wherein the orifice is provided in the valve housing.

3. The capacity control valve according to claim 1, wherein the pilot valve seat is formed in the first space.

4. The capacity control valve according to claim 1, wherein the CS valve seat is formed of an elastic body.

5. The capacity control valve according to claim 1, wherein the biasing member is disposed in the second space.

6. The capacity control valve according to claim 1, wherein an opening degree of the pilot valve is adjustable.

7. The capacity control valve according to claim 1,
wherein the CS valve body includes a hollow cylindrical body with an outer flange, and the outer flange is configured to slide on an inner peripheral surface of the valve housing.

8. The capacity control valve according to claim 7, wherein the CS valve body includes, in addition to the hollow cylindrical body with the outer flange, a ring that is externally inserted and fixed to the hollow cylindrical body in an airtight manner and that is provided with an abutting portion configured to abut the CS valve seat.

9. The capacity control valve according to claim 7,
wherein the CS valve body is configured to slide on an outer peripheral surface of a guide member into which the pilot valve body is inserted.

10. The capacity control valve according to claim 9,
wherein a complementary step is formed in an inner peripheral surface of the CS valve body and the outer peripheral surface of the guide member.

11. The capacity control valve according to claim 9,
wherein an elastic seal member is disposed between an inner peripheral surface of the CS valve body and the outer peripheral surface of the guide member.

12. The capacity control valve according to claim 11, wherein a complementary step is formed in the inner peripheral surface of the CS valve body and the outer peripheral surface of the guide member.

13. The capacity control valve according to claim 1, wherein the orifice is configured to discharge a fluid of the second space toward a suction chamber of a variable displacement compressor in which the suction fluid is housed external to the capacity control valve.

14. The capacity control valve according to claim 13, wherein the orifice is provided in the valve housing.

15. The capacity control valve according to claim 13, wherein the pilot valve seat is formed in the first space.

16. The capacity control valve according to claim 13, wherein an opening degree of the pilot valve is adjustable.

17. The capacity control valve according to claim 13,
wherein the CS valve body includes a hollow cylindrical body with an outer flange, and the outer flange is configured to slide on an inner peripheral surface of the valve housing.

18. The capacity control valve according to claim 17,
wherein the CS valve body is configured to slide on an outer peripheral surface of a guide member into which the pilot valve body is inserted.

19. The capacity control valve according to claim 18,
wherein an elastic seal member is disposed between an inner peripheral surface of the CS valve body and the outer peripheral surface of the guide member.

20. The capacity control valve according to claim 19, wherein a complementary step is formed in the inner peripheral surface of the CS valve body and the outer peripheral surface of the guide member.

* * * * *